(12) United States Patent
Tang et al.

(10) Patent No.: US 10,902,527 B2
(45) Date of Patent: Jan. 26, 2021

(54) COLLABORATIVE MULTIUSER PUBLISHING OF SOCIAL MEDIA POSTS

(71) Applicant: International Business Machines Corporation, Armonk, NY (US)

(72) Inventors: Yi Tang, Ningbo (CN); Ting Ting Wu, Ningbo (CN); Chen Xu, Ningbo (CN); Jinping Yu, Ningbo (CN); Bo Zhang, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 495 days.

(21) Appl. No.: 15/813,259

(22) Filed: Nov. 15, 2017

(65) Prior Publication Data
US 2019/0147549 A1 May 16, 2019

(51) Int. Cl.
*G06Q 10/10* (2012.01)
*G06Q 30/02* (2012.01)
*G06Q 10/06* (2012.01)
*G06Q 40/02* (2012.01)
*G06Q 50/00* (2012.01)
*H04L 29/06* (2006.01)
*G06F 16/335* (2019.01)
(Continued)

(52) U.S. Cl.
CPC ............ *G06Q 50/01* (2013.01); *G06F 16/335* (2019.01); *G06F 16/438* (2019.01); *G06F 16/958* (2019.01); *G06F 16/9535* (2019.01); *H04L 63/04* (2013.01); *H04L 63/104* (2013.01)

(58) Field of Classification Search
CPC ..... G06Q 50/01; G06F 16/335; G06F 16/438; G06F 16/9535; G06F 16/958; H04L 63/04; H04L 63/104

USPC .......................................... 705/1.1–912, 319
See application file for complete search history.

(56) References Cited

U.S. PATENT DOCUMENTS 7,774,431 B2   8/2010   Conn et al.
9,641,572 B1   5/2017   Yeskel et al.
(Continued)

FOREIGN PATENT DOCUMENTS

WO    2012054232 A2    4/2012

OTHER PUBLICATIONS

PCT, International Searching Authority, P201701248, PCT/IB2018/058908, dated Mar. 29, 2019.
(Continued)

*Primary Examiner* — Jonathan P Ouellette
(74) *Attorney, Agent, or Firm* — Garg Law Firm, PLLC; Rakesh Garg; Aaron Pontikos

(57) ABSTRACT

A public post is created in conjunction with a social media platform, where a first poster contributes a first subset of artifacts used in the public post and a second poster contributes a second subset of artifacts used in the public post. From the public post, a first version is generated corresponding to the first poster where the first version includes the first subset of artifacts and an artifact from the second subset of artifacts. A first view of the public post is generated for a first viewer, the first view presenting the first version in a public portion and a private post of the first poster in a private portion, where the first viewer is a member of a first social network of the first poster. A second view of the public post is generated for a second viewer, which presents a second version in the public portion.

25 Claims, 12 Drawing Sheets

(51) Int. Cl.
*G06F 16/438* (2019.01)
*G06F 16/9535* (2019.01)
*G06F 16/958* (2019.01)

(56) References Cited

U.S. PATENT DOCUMENTS

| | | | |
|---|---|---|---|
| 9,916,629 B2* | 3/2018 | Rubinstein | H04L 67/22 |
| 10,057,204 B2* | 8/2018 | Miller | H04L 63/102 |
| 10,701,020 B2* | 6/2020 | Miller | H04L 51/24 |
| 2011/0191417 A1* | 8/2011 | Rathod | G06Q 30/02 709/204 |
| 2012/0232998 A1* | 9/2012 | Schoen | G06Q 50/01 705/14.66 |
| 2013/0036169 A1* | 2/2013 | Quigley | G06Q 50/01 709/204 |
| 2013/0091204 A1* | 4/2013 | Loh | G06F 16/958 709/204 |
| 2013/0290337 A1 | 10/2013 | Prakash | |
| 2014/0006914 A1 | 1/2014 | Visconsi et al. | |
| 2014/0007249 A1 | 1/2014 | Altaf et al. | |
| 2014/0283095 A1 | 9/2014 | MacGregor et al. | |
| 2015/0039698 A1 | 2/2015 | Mavalankar | |
| 2015/0200893 A1* | 7/2015 | Harris | G06Q 10/101 709/206 |
| 2017/0032470 A1 | 2/2017 | Watanachote | |
| 2018/0285818 A1* | 10/2018 | Soltani | G06Q 10/101 |

OTHER PUBLICATIONS

Intellectual Property Office, Patents Act 1977 Examination Report under Section 18(3), GB2007983.6, P201701248GB1, dated Jun. 19, 2020.

* cited by examiner

COLLABORATIVE MULTIUSER PUBLISHING OF SOCIAL MEDIA POSTS

TECHNICAL FIELD

The present invention relates generally to a method, system, and computer program product for publishing posts on social media. More particularly, the present invention relates to a method, system, and computer program product for collaborative multiuser publishing of social media posts.

BACKGROUND

Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users. Hereinafter, a reference to "social media" or a "social media platform" is a reference to any one or more social media, or a combination thereof, described herein.

Data from social media comprises unidirectional sharing of content, bi-directional messages, or broadcast communications in a variety of languages and forms. Such communications in the social media are commonly referred to as "posts." The contents of posts can include natural language conversation, images, multimedia, and/or links or references, any of which can be in proprietary conversational styles, slangs or acronyms, urban phrases in a given context, formalized writing or publication, and other structured or unstructured data.

A user's contributions or interactions with the social media can include any type or size of data. For example, a user can post a variety of artifacts—such as text, pictures, videos, links, or combinations of these and other forms of information to a social media website. Furthermore, such information can be posted in any order, at any time, for any reason, and with or without any context.

A contribution can be a post or a comment or other type of response to the post. A user who creates and publishes a post is a posting user ("poster"). A contribution of a poster is the post. A user who views, receives, or otherwise perceives the post is a viewing user ("viewer"). A contribution of a viewer is a response to the post. For the purposes of this disclosure, a poster's surresponse to a viewer's response is regarded simply as another post.

Certain posts result from personal experiences or wishes of an individual poster. Such a post is referred to herein as a "private" post. Generally, the intended audience of a private post is a select group of such other users on the social media platform who are members of the poster's social network. Such a group is hereinafter referred to as a "network" of the poster or "network of friends" of the poster. Unless the immediate context of the term "network" indicates a different meaning of the term, a reference to a network is a reference to a network of friends of the poster.

The illustrative embodiments recognize that certain other posts result from a collective experience of many users, some or all of whom may be posters. For example, many posters may author and publish posts with similar accounts of a group event—e.g., of a company party. Posts which contain similar themes or contents, including but not necessarily exactly the same theme or content, and which are authored by a plurality of posters are referred to herein as "public" posts. While each poster of such a post intends the network of the poster to receive the post, essentially, similar content—which can often be duplicative—reaches social users outside an individual poster's network, e.g., by way of a similar post by another poster to that poster's network.

The illustrative embodiments also recognize that a viewer may be in the network of more than one poster of such public posts. Therefore, the viewer might download and view posts from more than one poster and find the posts to be largely duplicative. Two posts are regarded herein as duplicative when the posts are authored by different posters and contain similar—not necessarily exactly the same—information concerning a common theme or event. For example, two picture posts can be similar when they portray the same scene from two vantage points, or include a common subset of subjects. As another example, two textual posts can be duplicative if they provide an account of the same incidence in different words. As another example, two video posts can be duplicative if they each include at least a portion that covers the same occasion, even if from different time periods during the occasion, different vantage points from where the videos are captured, different commentaries, and the like.

The illustrative embodiments recognize that when duplicative posts are authored by a plurality of posters, the result can be duplicative information being posted to social media, data networks communicating data of duplicative posts, viewers downloading the duplicative posts, viewers wasting time reviewing the duplicative posts with marginal or no incremental benefit, inconsistent accounts of the theme or event emerging from the duplicative posts and confusing the viewer, or some combination of these and other undesirable effects. The illustrative embodiments recognize that a solution is needed using which a group of posters can collaborate to create a single public post, and using which different views of the public post can be constructed and controlled for different viewers under different circumstances.

SUMMARY

The illustrative embodiments provide a method, system, and computer program product. An embodiment includes a method that creates, using a processor and a memory in conjunction with a social media platform, a public post, wherein a first poster contributes a first subset of a set of artifacts used in the public post and a second poster contributes a second subset of a set of artifacts used in the public post. The embodiment generates, from the public post, a first version corresponding to the first poster wherein the first version includes the first subset of artifacts and an artifact from the second subset of artifacts. The embodiment generates a first view of the public post for a first viewer, the first view presenting the first version in a public portion and a private post of the first poster in a private portion, wherein the first viewer is a member of a first social network of the first poster. The embodiment generates a second view of the public post for a second viewer, the second view presenting a second version in the public portion. Thus, the embodiment provides a method by which a group of posters can collaborate to create a single public post, of which different posters can construct different versions for their own networks, and using which different views of the public post can be constructed and controlled for different viewers under different circumstances.

Another embodiment further generates, from the public post, the second version corresponding to the second poster wherein the second version includes the second subset of artifacts and an artifact from the first subset of artifacts. The embodiment presents a private post of the second poster in the private portion, wherein the second viewer is a member of a second social network of the second poster. Thus, the embodiment allows construction of different versions of a single public post without a viewer in the second poster's network receiving duplicate public posts artifacts or public post artifacts that were not selected by the second poster.

Another embodiment further generates, from the public post, the second version corresponding to the second poster wherein the second version includes the second subset of artifacts and an artifact from the first subset of artifacts. The embodiment combines, in the second view, the first version and the second version, wherein the second viewer is a member of the social network of the first poster, and of a second social network of the second poster. Thus, the embodiment allows construction of a unified version of a public post without a viewer receiving duplicate public posts artifacts when the user is a member of the networks of multiple posters in the group that is collaborating on the public post.

Another embodiment further presents, in the private portion of the second view, the private post of the first poster and a private post of the second poster in the private portion. Thus, the embodiment allows the private posts to be posted and viewed together with the public post.

Another embodiment further generates, from the public post, the second version corresponding to the second poster wherein the second version includes only the second subset of artifacts. Thus, the embodiment allows construction of different versions of a single public post without a viewer in the second poster's network receiving duplicate public posts artifacts or public post artifacts that were not selected by the second poster.

Another embodiment further retains, in the first view, a single instance of an artifact that is present in the first subset and the second subset. Thus, the embodiment allows construction of a view such that the view does not include duplicates of an artifact when the view combines multiple versions where each version could contain the same artifact.

Another embodiment further denies, responsive to the first viewer not being a member of a social network of the second poster, the first viewer a permission to enter a comment relative to the artifact from the second subset in the first view. Thus, the embodiment manages the commenting at the artifact-level and does not permit commenting on an artifact that is contributed by a poster who is not in the viewer's network.

Another embodiment further allows, responsive to the first viewer being a member of the social network of the first poster, the first viewer to enter a second comment relative to an artifact from the first subset in the first view. Thus, the embodiment manages the commenting at the artifact-level and does permit commenting on an artifact that is contributed by a poster who is in the viewer's network.

Another embodiment further initiates creating the public post by adding to the public post the first subset of artifacts contributed by the first poster and the second subset of artifacts contributed by the second poster, wherein the first poster and the second poster are members of a group of posters collaborating in the creating of the public post. Thus, the embodiment allows the collaboration on the public post to have a repository-like feature where the group members can add their contributions and from which different posters can pick and choose different subsets of artifacts for their respective views.

Another embodiment further initializes a timer, the timer limiting a period during which the public post is enabled for editing the first version, wherein the editing modifies an inclusion status of an artifact in the first version, the artifact being a member of any of a plurality of subsets of artifacts, the plurality of subsets of artifacts being contributed by a plurality of members of the group. Thus, the embodiment allows the collaboration on the public post to have a timed repository-like feature where the group members can add their contributions within a specified period and from which different posters can pick and choose different subsets of artifacts for their respective views until the specified period has not elapsed.

Another embodiment further disables, responsive to the timer expiring, the editing of the first version. Thus, the embodiment freezes or closes the collaboration on the public post when the specified period has elapsed.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
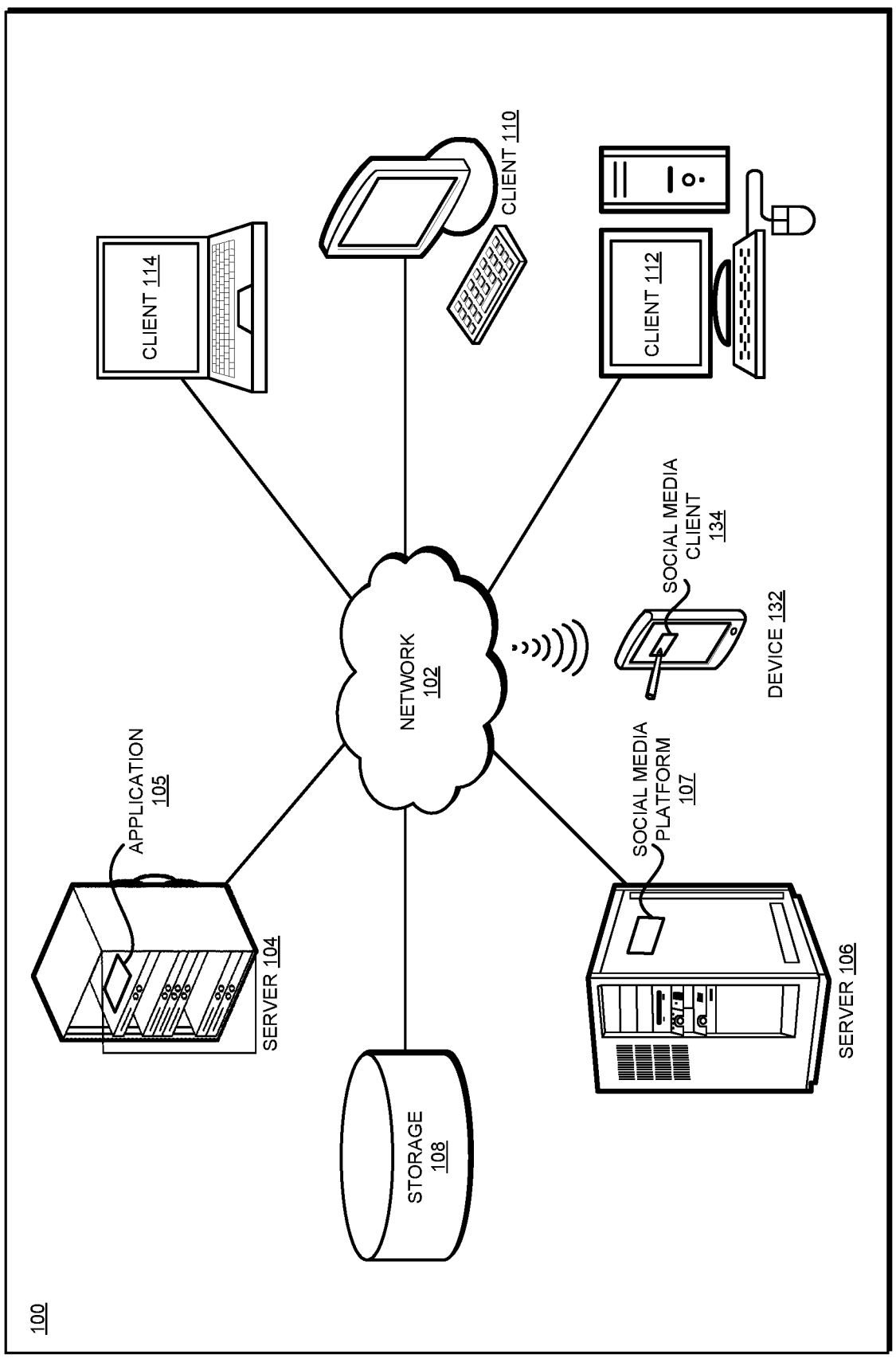
FIG. 1 depicts a block diagram of a network of data processing systems in which illustrative embodiments may be implemented.

The illustrative embodiments recognize that the presently available social media publishing tools or solutions do not address these needs/problems or provide adequate solutions for these needs/problems. The illustrative embodiments used to describe the invention generally address and solve the above-described problems and other related problems by collaborative multiuser publishing of social media posts.

An embodiment can be implemented as a software application. The application implementing an embodiment, or one or more components thereof, can be configured as a modification of an existing social media platform system—i.e., a native application in the social media platform system, as an application executing in a data processing system communicating with an existing social media platform system over a short-range radio network such as Bluetooth, over a wired or wireline local area network (LAN)—i.e., a local application on the LAN, as an application executing in a data processing system communicating with an existing social media platform system over a wide area network (WAN)—i.e., a remote application on the WAN, as a separate application that operates in conjunction with an existing social media platform system in other ways, a standalone application, or some combination thereof.

An embodiment provides a collaboration functionality for collaboratively authoring a public post. A poster (user P1) in a group of posters (user P1, user P2 . . . user Pn) use this functionality to initiate the creation of a public post. User P1 contributes some artifacts to the public post being created. Before the public post is published, other users, such as user P2 can contribute to the public post additional artifacts, select or adopt some all or none of the user's own contributions, select or adopt some all or none of the artifacts contributed by user P1 as their own, change an artifact in the public post, or some combination of these actions.

Optionally, when the creation of the public post begins, one embodiment initializes a creation timer. For example, an initial poster from a group may initiate the creation of the public post as well as the creation timer. The creation timer limits a duration within which other posters from the group can contribute artifacts, selects already contributed artifacts, or make other edits or changes to the public post. Once the creation timer elapses, the state of the public post is frozen and further changes the public post cannot be performed, a version of the public post corresponding to each poster from the group is frozen from further changes, or both. The version aspect will become cleared in the following description.

In one embodiment, the public post is posted automatically after the creation timer elapses. In another embodiment, after the creation timer elapses, the initial poster is allowed to post the public post alone, or the public post with a private post, at a time selected by the initial poster.

The posters from the group may also be creating private posts separate from the public post that is being collaboratively created. Different posters from the group may have created different private posts. Furthermore, different posters from the group may have contributed, selected, or edited different artifacts in the public post being created. Each poster who is a member of the group has a version of the public post. A view of the publication of a poster—who is a group member—depends on the role of the viewer viewing the publication. The view aspect will become cleared in the following description.

Consider the following non-limiting example—users P1, P2 and P3 are in the group of posters and create a public post. P1 contributes artifacts A, B, and C to the public post; P2 contributes D and E; and P3 contributes F and G. Furthermore, P2 also selects A and F into P2's version of the public post; and P3 also selects B into P3's version of the public post.

An embodiment analyzes that P1, P2, and P3 have each selected different subsets of the overall set of artifacts (A, B, C, D, E, F, G). P1's subset includes (A, B, C). P2's subset includes [(D, E), (A), (F)]. P3's subset includes [(F, G), (B)]. These subsets represent the versions of the same public post that correspond to each of the posters in the group. It is possible for a poster to have a null subset or the entire set of artifacts from the group in the poster's version.

Further consider that P1 has also created a private post P; P2 has also created a private post Q; and P3 has also created a private post R.

Now consider some example viewers—viewer V1 belongs only to P1's network. Viewer V2 belongs only to P2's network. Viewer V3 belongs to the networks of P1 and P2. Viewer V4 belongs to the networks of P2 and P3. Viewer V5 belongs to the networks of all group members—P1, P2, and P3.

An embodiment constructs a view for viewer V1 according to V1's network memberships with various poster members of the group. Accordingly, V1 should be able to view only what P1 is choosing to post. Therefore, the embodiment constructs a view for V1 which includes—(i) the public post version with artifacts (A, B, C) and (ii) private post P.

Similarly, V2 should be able to view only what P2 is choosing to post. Therefore, the embodiment constructs a view for V2 which includes—(i) the public post version with artifacts [(D, E), (A), (F)] and (ii) private post Q. V3 should be able to view only what P1 and P2 are choosing to post. Therefore, the embodiment constructs a view for V2 which includes—(i) the public post version with artifacts [(A, B, C)] and [(D, E), (A), (F)] and (ii) private posts P and Q. In this case, only a single instance of A is included regardless of the number of appearances of artifact A in the subsets included in the view. The artifacts need not be rearranged in a view and the view can be (D, E, A, F, B, C), P, Q. If the artifacts are rearranged in in some order in the view, the view of V3 may become (A, B, C, D, E, F), P, and Q.

By similar reasoning, V4 can view everything P2 and P3 posted, accordingly, V4's view includes, i.e., [(D, E), (A), (F)] and [(F, G), (B)] in the public post, and Q and R private posts. In this case, only a single instance of F is included regardless of the number of appearances of artifact F in the subsets included in the view. If the artifacts are rearranged in the view, V4's view becomes (A, B, D, E, F, G), Q and R.

V5 can view everything P1, P2, and P3 posted, accordingly, V5's view includes, i.e., [(A, B, C)], [(D, E), (A), (F)] and [(F, G), (B)] in the public post, and P, Q, and R private posts. Again, only a single instance of each artifact is included in V5's view regardless of the number of appearances of an artifact in the subsets included in the view. If the artifacts are rearranged in the view, V5's view becomes (A, B, C, D, E, F, G), P, Q, and R.

It is possible in a group of posters, that a poster, e.g., P1, may choose not to contribute or select any public post artifacts of a public post but posts a private post. In such a case, a viewer who is only in P1's network, e.g., V1, will see only P1's private post and not public post from the group. A viewer who is a member of P1's group and another poster's group, e.g., V3 (member of P1's group and P2's group), will see the private posts of P1 and P2, and the public post according to P2's version.

It is also possible in a group of posters, that a poster, e.g., P1, may choose not to contribute or select any public post artifacts of a public post, and not to post any private post either. In such a case, a viewer who is only in P1's network, e.g., V1, will not see any private post from P1, and not see the public post from the group. A viewer who is a member of P1's group and another poster's group, e.g., V3 (member of P1's group and P2's group), will see the private posts of P2, and the public post according to P2's version.

A view can be generated based on the order in which the artifacts were selected by the posters. Alternatively, a view can be generated based on an order of artifacts according to the viewer's preference. Generally, an embodiment can be adapted to arrange the artifacts in a generated view in any suitable manner.

When a viewer indicates a desire to enter a comment relative to a post or an artifact, an embodiment analyzes the ownership of the artifact involved to determine whether to permit the comment. For example, if V1 chooses to comment on V1's view—which includes public post version with artifacts (A, B, C) and private post P, the embodiment may permit commenting on the view because all artifacts are contributed by P1 in that view.

Now suppose that V2 chooses to comment on V2's view—which includes public post version with artifacts [(D, E), (A), (F)] and private post Q. One embodiment permits commenting relative to artifacts D and E and post Q but not relative to artifacts A or F because artifacts A and F were contributed by P1 and P3, not by P2. Alternatively, another embodiment permits commenting relative to artifacts D and E, post Q, and also relative to artifacts A or F because artifacts A and F have been selected or adopted by P2 for inclusion into P2's version of the public post, regardless of who contributed artifacts A and F.

Similarly, when V3 chooses to comment on V3's view—which includes public post version with artifacts [(D, E), (A), (F)] and private post Q. One embodiment permits commenting relative to artifacts D and E and post Q but not relative to artifacts A or F because artifacts A and F were contributed by P1 and P3, not by P2. Alternatively, another embodiment permits commenting relative to artifacts D and E, post Q, and also relative to artifacts A or F because artifacts A and F have been selected or adopted by P2 for inclusion into P2's version of the public post, regardless of who contributed artifacts A and F. By using an appropriate embodiment, V4 and V5 may be similarly permitted to comment on all artifacts present in their respective views or only relative to those artifacts that are contributed by the poster(s) in whose network(s) the viewer belongs.

One embodiment allows any poster in the group to publish the public post. Another embodiment only provides certain poster(s) with publishing authority.

One embodiment closes the public post for further edits, changes, selections, or contributions upon publishing. Another embodiment allows changes, selections, or contributions to continue after the public post has been published.

These examples of creating the public post, versioning the public post for different posters in the group, creating views for viewers with different network memberships, permissions, etc. are not intended to be limiting. From this disclosure, those of ordinary skill in the art will be able to conceive many other adaptations of these operations and the same are contemplated within the scope of the illustrative embodiments.

The manner of collaborative multiuser publishing of social media posts described herein is unavailable in the presently available methods. A method of an embodiment described herein, when implemented to execute on a device or data processing system, comprises substantial advancement of the functionality of that device or data processing system in consolidating similar social media posts via collaborations beginning at the creation time, and in managing access to the various versions of the public post via the viewer-specific various views of the public post.

The illustrative embodiments are described with respect to certain types of social media, posts, artifacts, versions, views, permissions, selections, changes, contributions, memberships, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
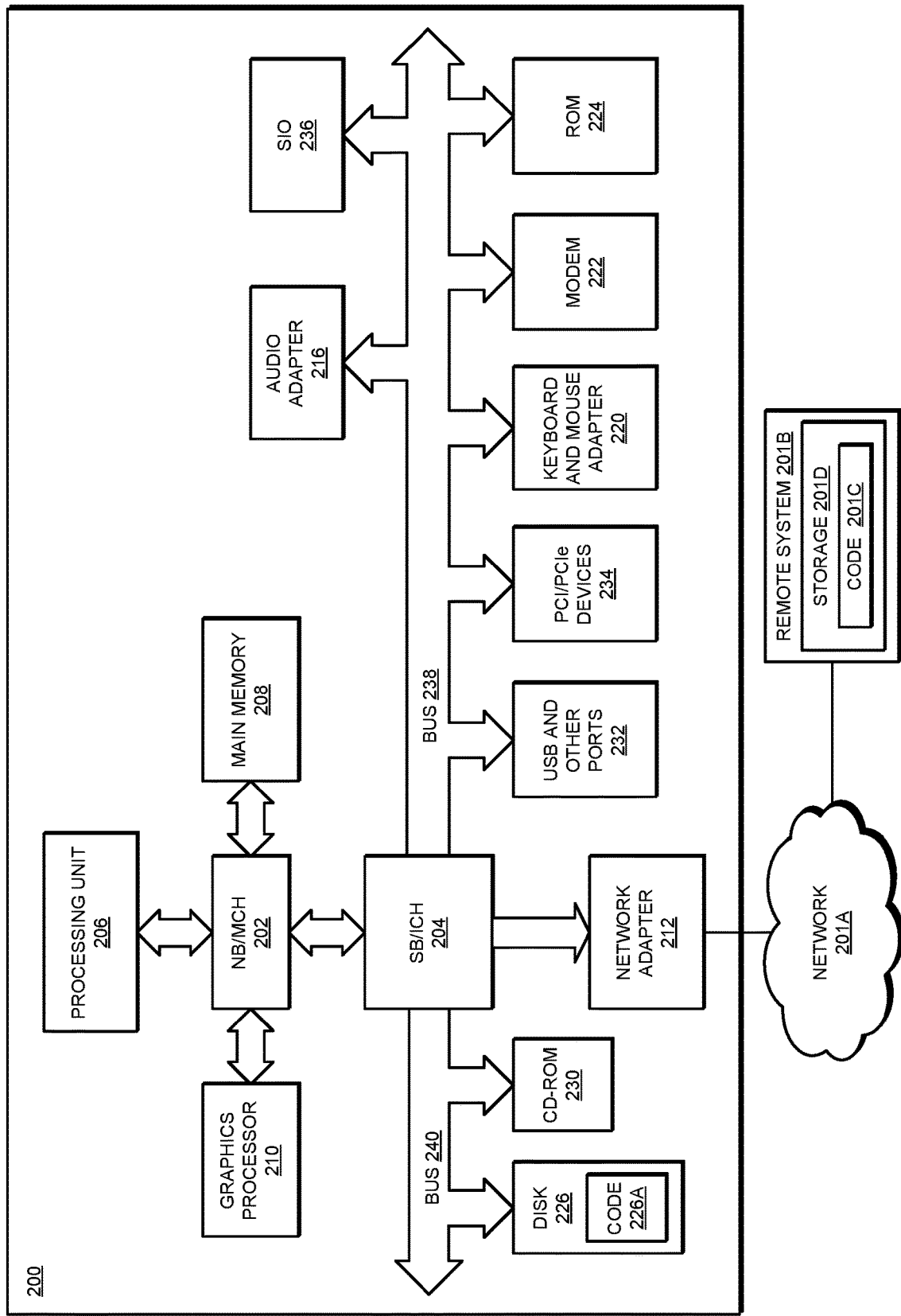
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 operates in conjunction with social media platform 107 to create a public post, create versions of the public post, construct views of the public post, and generate combined viewer-specific views using the public post views and private posts. Social media client 134 is usable to receive and interact with a view as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
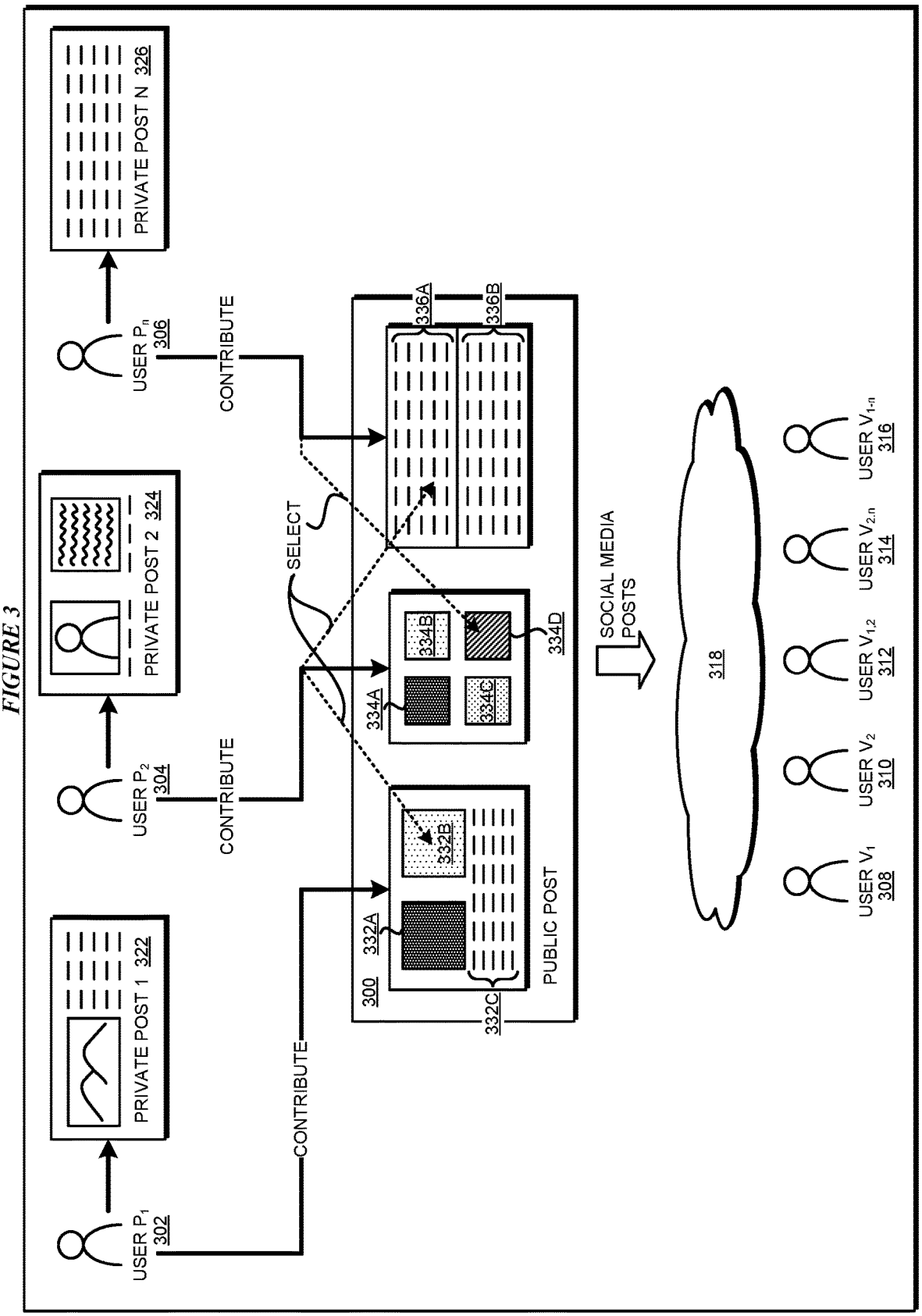
FIG. 3 depicts a block diagram of an example manner of collaboratively constructing a public post in accordance with an illustrative embodiment.

With reference to FIG. 3, this figure depicts a block diagram of an example manner of collaboratively constructing a public post in accordance with an illustrative embodiment. Application 105 can be used to construct public post 300.

N posters—posters 302 (user $P_1$), 304 (user $P_2$), and so on until poster 306 (user $P_n$) form an example group of posters. M viewers are members of the networks of the various posters—for example, viewer 308 (user $V_1$ who is a member of the network of $P_1$), viewer 310 (user $V_2$ who is a member of the network of $P_2$), viewer 312 (user $V_{1,2}$ who is a member of the networks of $P_1$ and $P_2$), viewer 314 (user $V_{2,n}$ who is a member of the networks of $P_2$ and $P_n$), and viewer 316 (user $V_{1-n}$ who is a member of the networks of $P_1$ through $P_n$). Viewers 308-316 receive posts of posters 302, 304, 306, and other posters from a social media platform similar to social media platform 107 in FIG. 1 over data network 318.

Poster 302 creates private post 322. Poster 304 creates private post 324. Poster 306 creates private post 326.

Posters 302-306 collaboratively create public post 300. Poster 302 contributes artifacts 332A, 332B, and 332C to public post 300. Poster 304 contributes artifacts 334A, 334B, 334C, and 334D to public post 300. Poster 306 contributes artifacts 336A and 336B to public post 300. Poster 304 further selects poster 302's artifact 332B and poster 306's artifact 336A to include in poster 304's version of public post 300. Similarly, Poster 306 further selects poster 304's artifact 334D to include in poster 306's version of public post 300.

Figure 4:
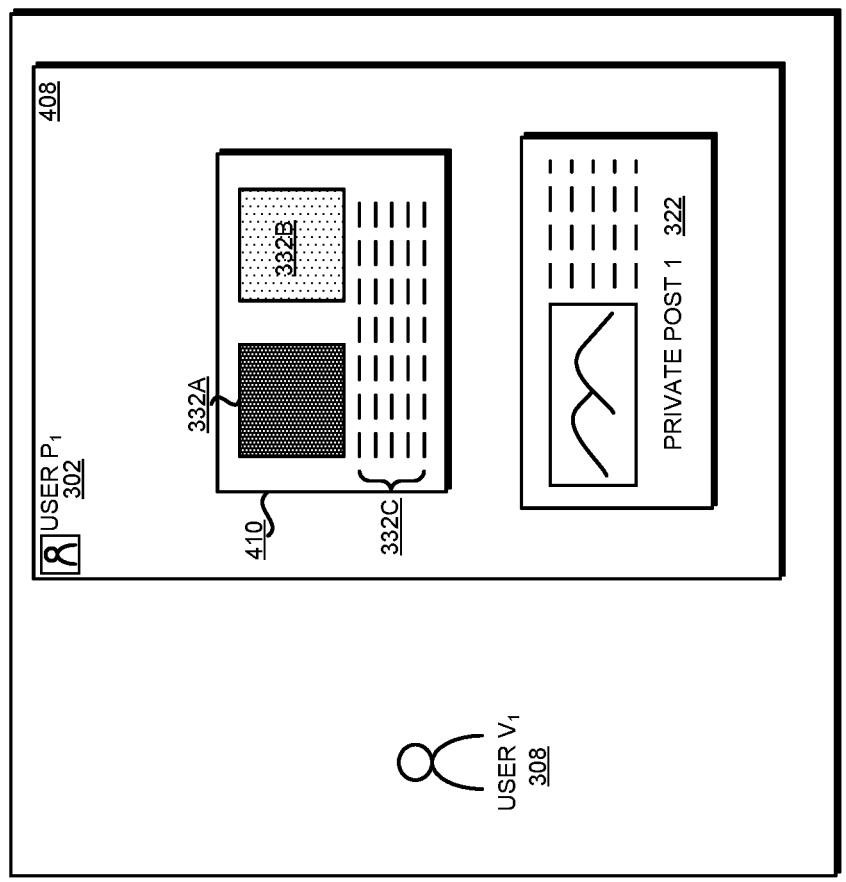
FIG. 4 depicts a block diagram of an example viewer-specific combined view in accordance with an illustrative embodiment.

With reference to FIG. 4, this figure depicts a block diagram of an example viewer-specific combined view in accordance with an illustrative embodiment. User 308, private post 322, and public post artifacts 332A, 332B, and 332C are the same as in FIG. 3.

As described with respect to FIG. 3, user 308 is only in poster 302's network. Thus, view 408 includes version 410 of public post 300 and private post 322 of poster 302. Version 410 of public post 300 includes only what poster 302 has contributed or selected to include in their version of public post 300, namely, artifacts 332A, 332B, and 332C.

Figure 5:
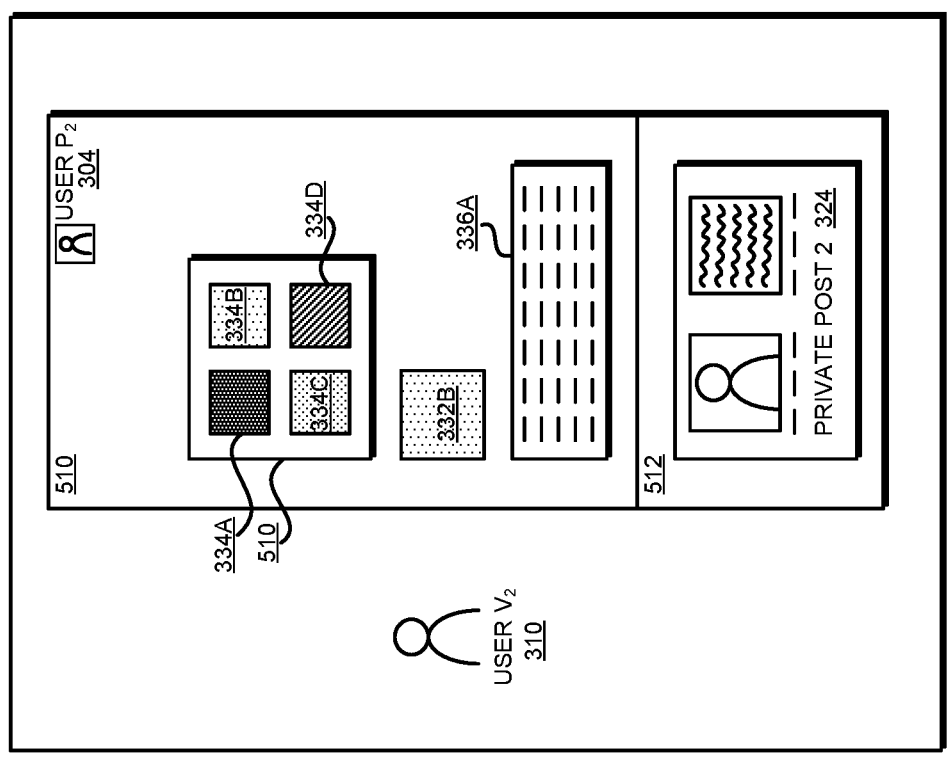
FIG. 5 depicts a block diagram of another example viewer-specific combined view in accordance with an illustrative embodiment.

With reference to FIG. 5, this figure depicts a block diagram of another example viewer-specific combined view in accordance with an illustrative embodiment. User 310, private post 324, and public post artifacts 334A, 334B, 334C, 334D, 332B, and 336A are the same as in FIG. 3.

As an example, view 508 includes public portion 510 in which public posts are presented and private portion 512 in which private posts are presented. As described with respect to FIG. 3, user 310 is only in poster 304's network. Thus, public portion 510 of view 508 presents the version of public post 300 that poster 304 selected. Private portion 512 presents private post 324 of poster 304.

Poster 304's version of public post 300 in public portion 510 includes what poster 304 has contributed or selected to include in their version of public post 300, namely, artifacts 334A, 334B, 334C, 334D, 332B, and 336A, which come from different posters as described with respect to FIG. 3.

Figure 6:
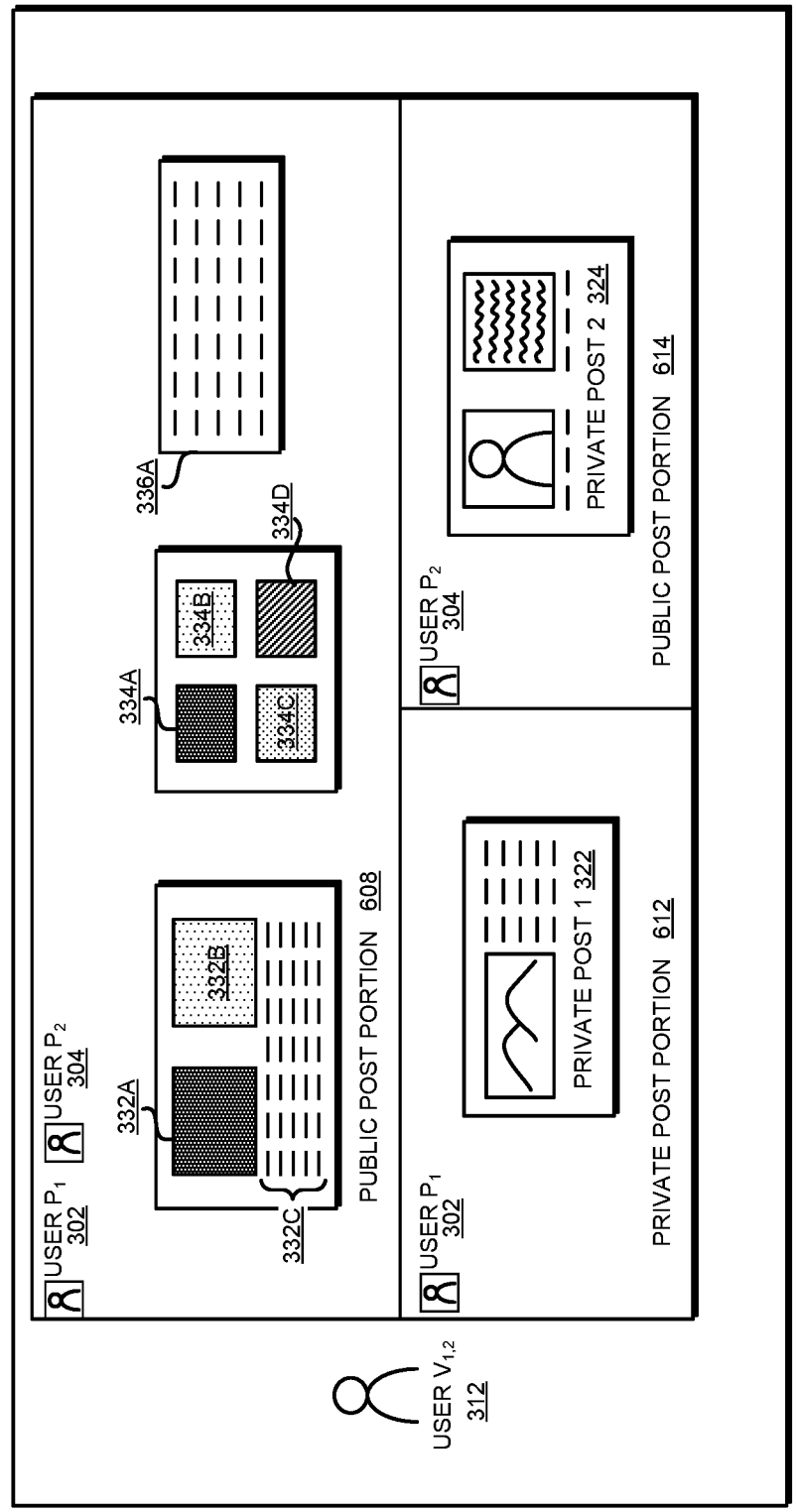
FIG. 6 depicts a block diagram of another example viewer-specific combined view in accordance with an illustrative embodiment.

With reference to FIG. 6, this figure depicts a block diagram of another example viewer-specific combined view in accordance with an illustrative embodiment. User 312, private posts 322 and 324, and public post artifacts 332A, 332B, 332C, 334A, 334B, 334C, 334D, and 336A are the same as in FIG. 3.

More than one private portions can be present in a combined view, e.g., to present different private posts from different posters separately when the viewer is a member of multiple posters' networks. As an example, view 608 includes public portion 610 in which public posts are presented, and private portions 612 and 614 in which private posts from different posters in viewer 312's network are presented. As described with respect to FIG. 3, user 312 is in the networks of posters 302 and 304. Thus, public portion 610 of view 608 presents a combined version of public post 300 that posters 302 and 304 selected. The combined version in public portion 610 presents only one instance of an artifact that is selected in the versions of multiple posters, and may optionally rearrange the presented artifacts in a manner described herein.

Private portion 612 presents private post 322 of poster 302. Private portion 614 presents private post 324 of poster 304.

Figure 7:
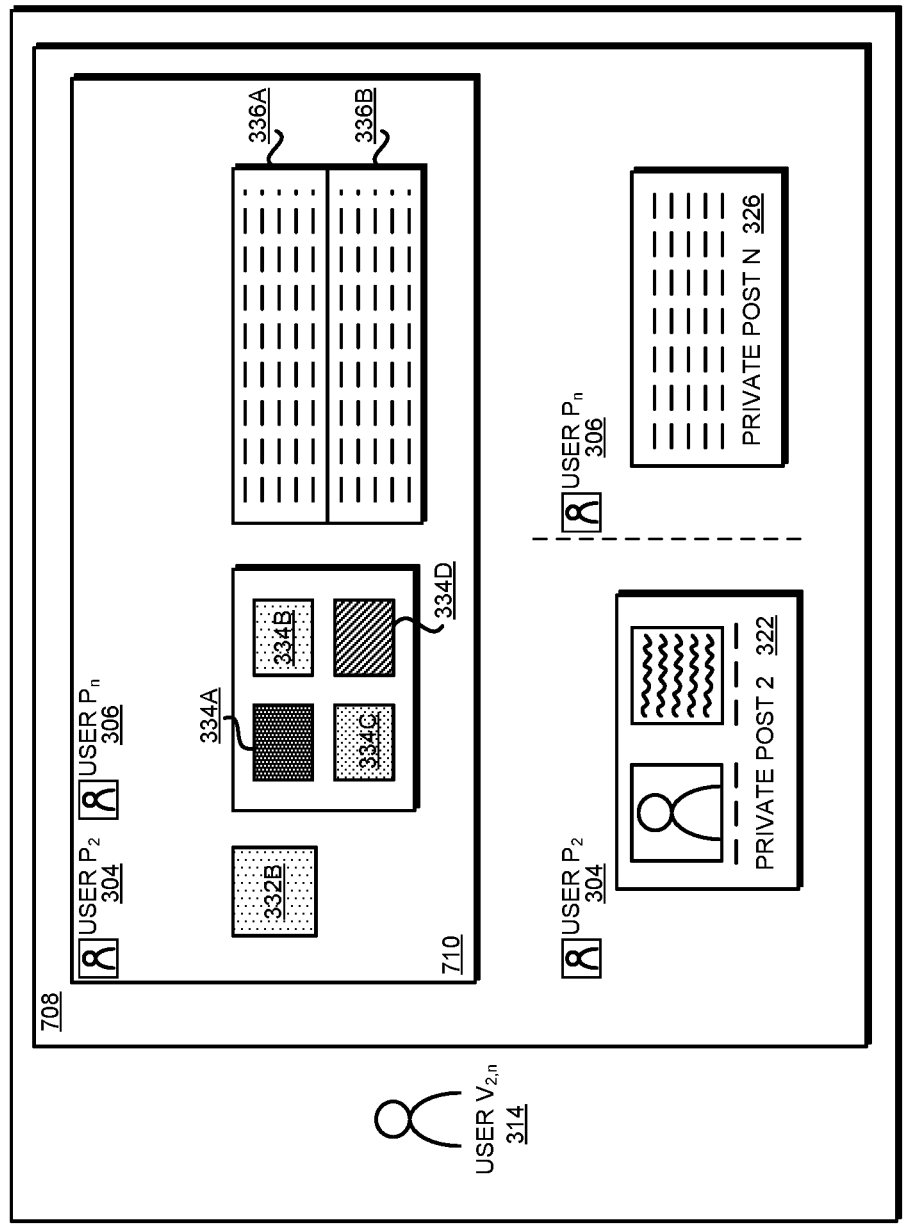
FIG. 7 depicts a block diagram of another example viewer-specific combined view in accordance with an illustrative embodiment.

With reference to FIG. 7, this figure depicts a block diagram of another example viewer-specific combined view in accordance with an illustrative embodiment. User 314, private posts 322 and 326, and public post artifacts 332B, 334A, 334B, 334C, 334D, 332B, 336A, and 336B are the same as in FIG. 3.

A view may include a public portion and the remainder of the view may present private posts from one or more posters without any separation. As an example, view 708 includes public portion 710 in which public posts are presented, and an implied private portion in which private posts from different posters are presented. As described with respect to FIG. 3, user 314 is in the networks of posters 304 and 306. Thus, public portion 710 of view 708 presents a combined public version of the individual public post 300 versions that posters 304 and 306 selected. The combined version in public portion 710, namely, artifacts 332B, 334A, 334B, 334C, 334D, 332B, 336A, and 336B.

Private post 322 of poster 302 and private post 326 of poster 306 are presented in the remainder of view 708 in any suitable manner.

Figure 8:
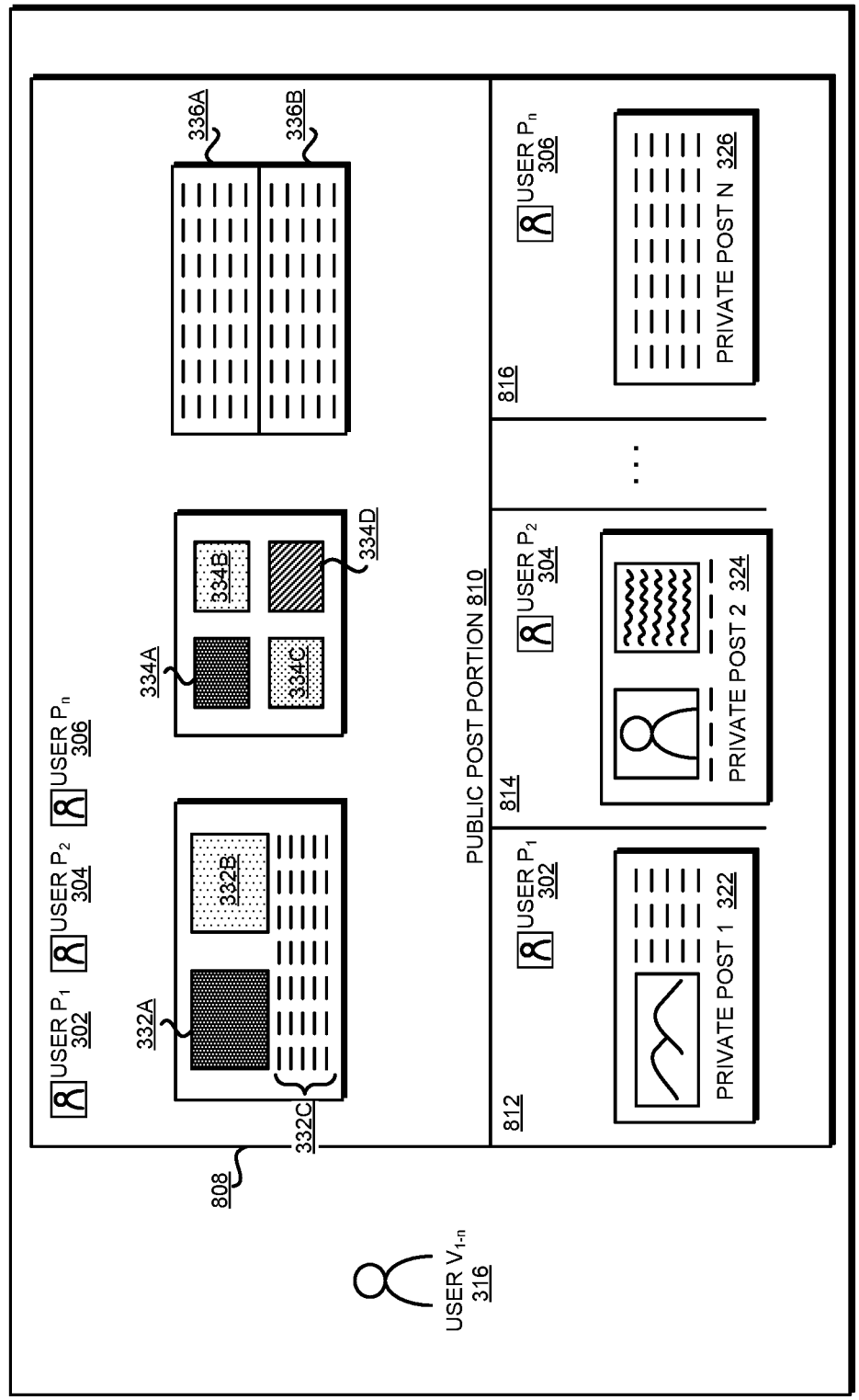
FIG. 8 depicts a block diagram of another example viewer-specific combined view in accordance with an illustrative embodiment.

With reference to FIG. 8, this figure depicts a block diagram of another example viewer-specific combined view in accordance with an illustrative embodiment. User 316, private posts 322, 324, and 326, and public post artifacts 332A, 332B, 332C, 334A, 334B, 334C, 334D, 336A, and 336B are the same as in FIG. 3.

Similar to view 608 in FIG. 6, view 808 shows a single public portion 810 and multiple private portions 812, 814 . . . 816, according to viewer 316's membership in the networks of posters 302, 304 . . . 306. The combined version in public portion 810 presents only one instance of an artifact that is selected in the various individual versions of multiple posters, and may optionally rearrange the presented artifacts in a manner described herein.

Figure 9:
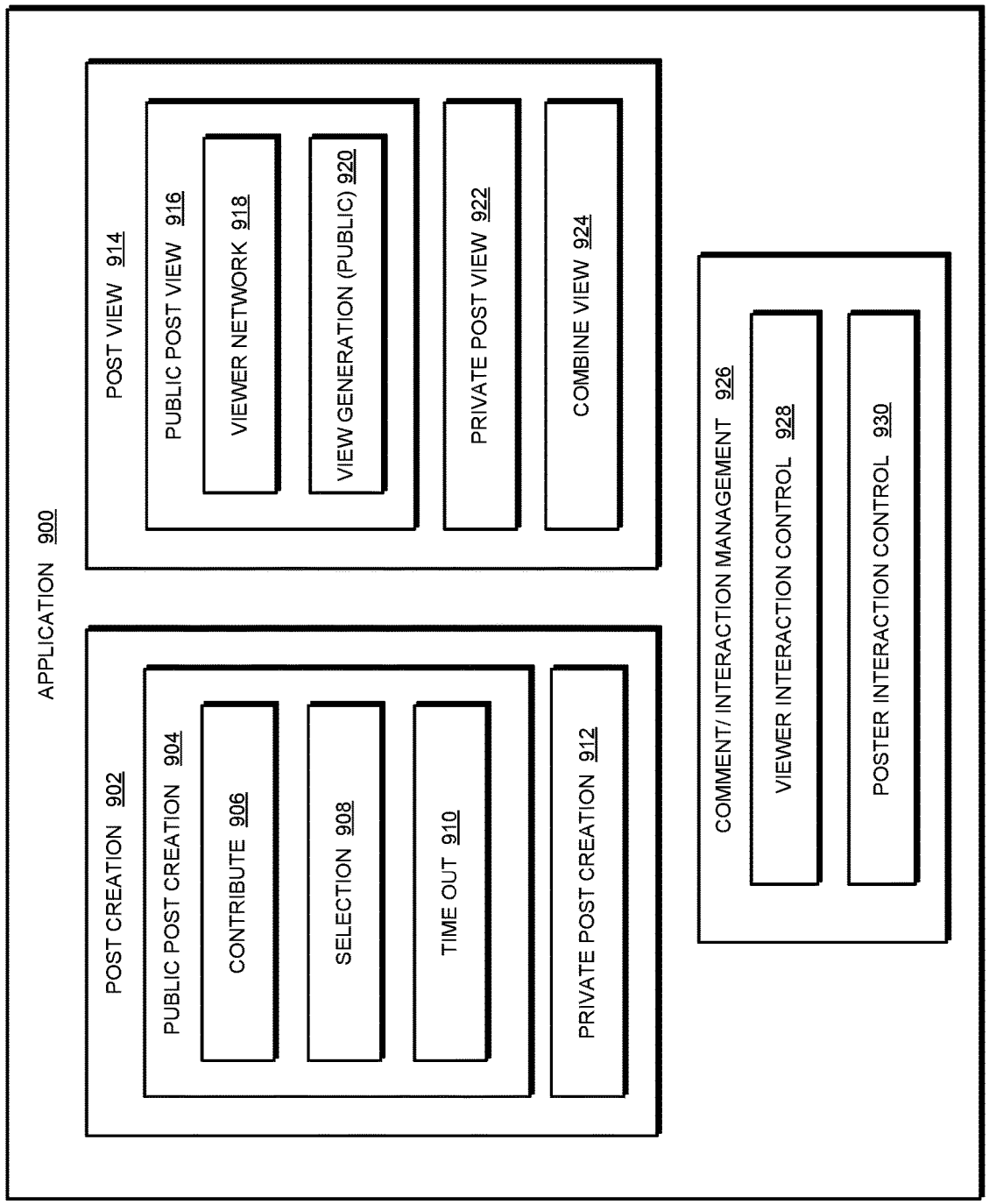
FIG. 9 depicts a block diagram of an application for collaborative multiuser publishing of social media posts in accordance with an illustrative embodiment.

With reference to FIG. 9, this figure depicts a block diagram of an application for collaborative multiuser publishing of social media posts in accordance with an illustrative embodiment. Application 900 can be implemented as application 105 in FIG. 1, to create public post 300 and versions thereof, and the various views depicted in FIGS. 4-8.

Post creation functionality 602 enables a poster to create public and private posts. Public post creation component 904 specifically enables a group of posters to collaborate in creating a public post as described herein. Specifically, subcomponent 906 is usable by a poster to contribute artifacts to a public post. Subcomponent 908 is usable by a poster to select an already contributed artifact for inclusion in the poster's version of the public post. Subcomponents 906 and 908 operate to create a poster-specific version of the public post, as described herein.

Subcomponent 910 implements the optional creation timer to limit the period during which the public post can be modified by the group of posters. A poster can use private post creation component 912 to create a private post as well.

Post view functionality 914 creates viewer-specific views using a combination of one or more poster-specific versions of a public post, one or more private posts of one or more posters, or some combination thereof. Specifically, public post view component 916 performs the public view generation.

For example, subcomponent 918 determines the network memberships of a viewer who is to receive a public post or a version thereof. Using the determined memberships, subcomponent 920 generates a viewer-specific view, e.g. in the manner of views 408, 508, 608, 708, 808, a variation thereof, or a combination thereof.

Component 922 generates a view of any private posts as needed, and as configured on a particular social media platform. Component 924 produces a combined view from the public post view and the private post view.

Functionality 926 manages any interactions with a public post. For example, component 928 determines whether a viewer is permitted to comment on or interact with the public post as a whole or an artifact therein, in a manner described herein. When permissible, component 928 allows comment entry relative to the public post or an artifact therein.

Component 930 determines whether a poster is permitted to interact with the public post as a whole or an artifact therein. For example, the editing or changing of the public post may be closed by a timer elapsing in a manner described herein. In such a case, component 930 may prevent the poster from interacting with the public post. Furthermore, when permissible, component 930 allows a poster to make a surresponse entry relative to the public post or an artifact therein.

Figure 10:
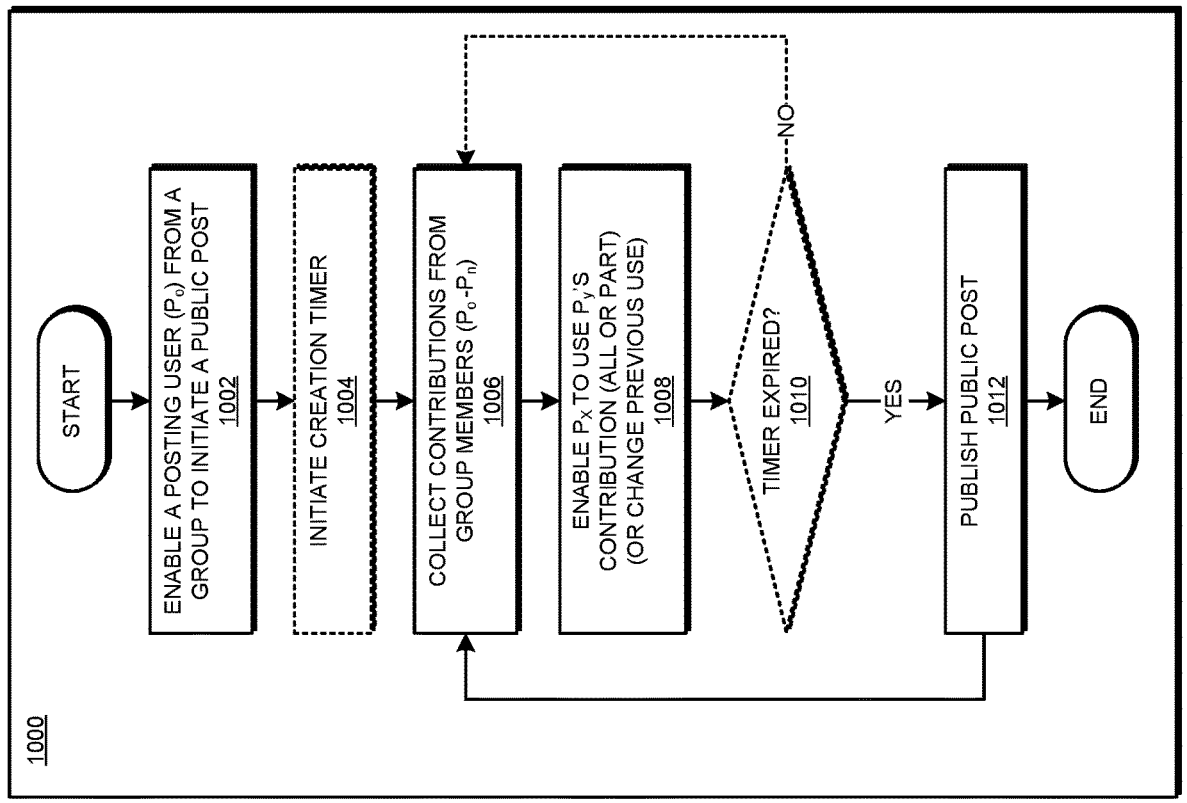
FIG. 10 depicts a flowchart of an example process for creating a publishing a collaborative public post in accordance with an illustrative embodiment.

With reference to FIG. 10, this figure depicts a flowchart of an example process for creating a publishing a collaborative public post in accordance with an illustrative embodiment. Process 1000 can be implemented in application 900, e.g., in functionality 902.

The application enables a poster from a group to initiate crating a public post (block 1002). The application optionally also initiates a creation timer (block 1004).

The application collects artifact contributions from the posters in the group (block 1006). The application enables a poster in the group to select/adopt/reuse an artifact contributed to the public post by another poster (block 1008).

If a timer is implemented, the application returns to block 1006 and repeats the creation/editing/manipulation process of blocks 1006 and 1008 until the timer expires ("No" path of block 1010). When the timer expires ("Yes" path of block 1010), the application proceeds to publish the public post that has been created (block 1012).

If the timer is not implemented, the application may optionally allow the creation/editing/manipulation of the public post even after the public post has been published (block 1014). The publishing of the public post causes different poster-specific versions of the single public post to become available without the public post being replicated to the viewers in the networks of different posters. The application ends process 1000 thereafter.

Figure 11:
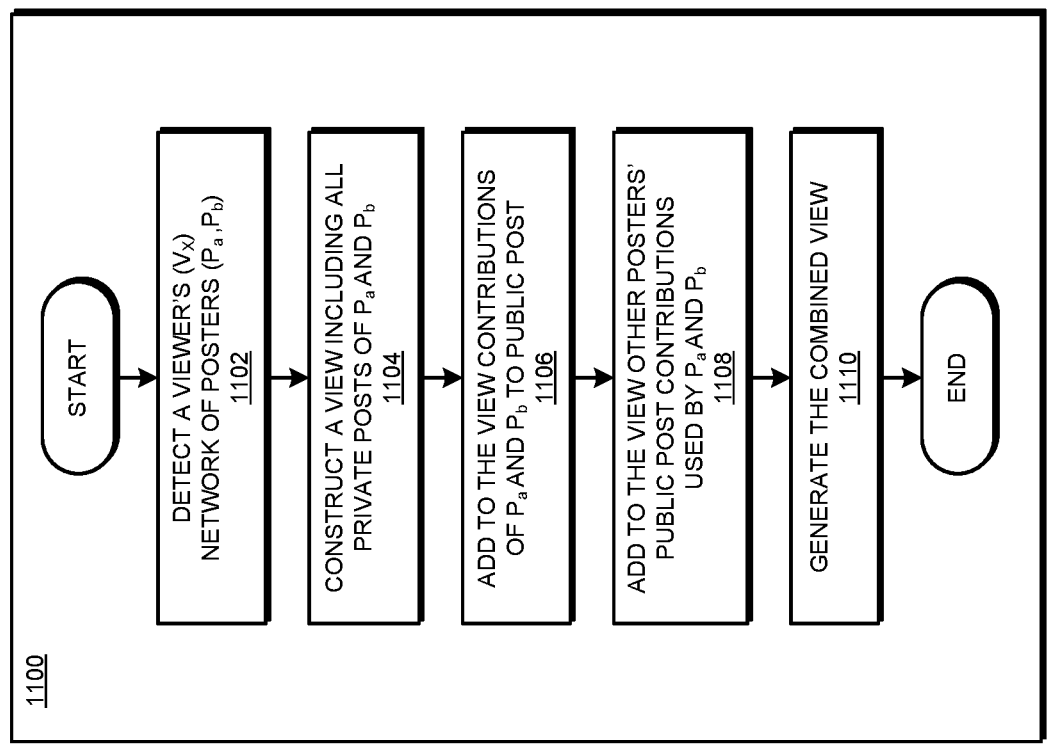
FIG. 11 depicts a flowchart of an example process for constructing a viewer-specific views of a collaborative public post in accordance with an illustrative embodiment.

With reference to FIG. 11, this figure depicts a flowchart of an example process for constructing a viewer-specific views of a collaborative public post in accordance with an illustrative embodiment. Process 1100 can be implemented in application 900, e.g., in functionality 914 in FIG. 9.

The application determines a viewer's network memberships (block 1102). The application constructs a view for the user by including all private posts of the posters in the viewer's network (block 1104).

The application adds to the view, e.g., in a public post portion of the view, the contributions of the in-network posters to a public post (block 1106). The application further adds to the view those contributions of other out-of-network posters which an in-network poster has selected/adopted/used in the public post (block 1108). Any duplicate artifacts added as a result of blocks 1106 and 1108 are reduced to a single instance of that artifact. Optionally, the reduced set of artifacts in the view is rearranged in a suitable manner.

The application generates the public post portion of the view from the reduced and optionally rearranged artifacts resulting from the operation of blocks 1106 and 1108 (block 1110). The application ends process 1100 thereafter.

Figure 12:
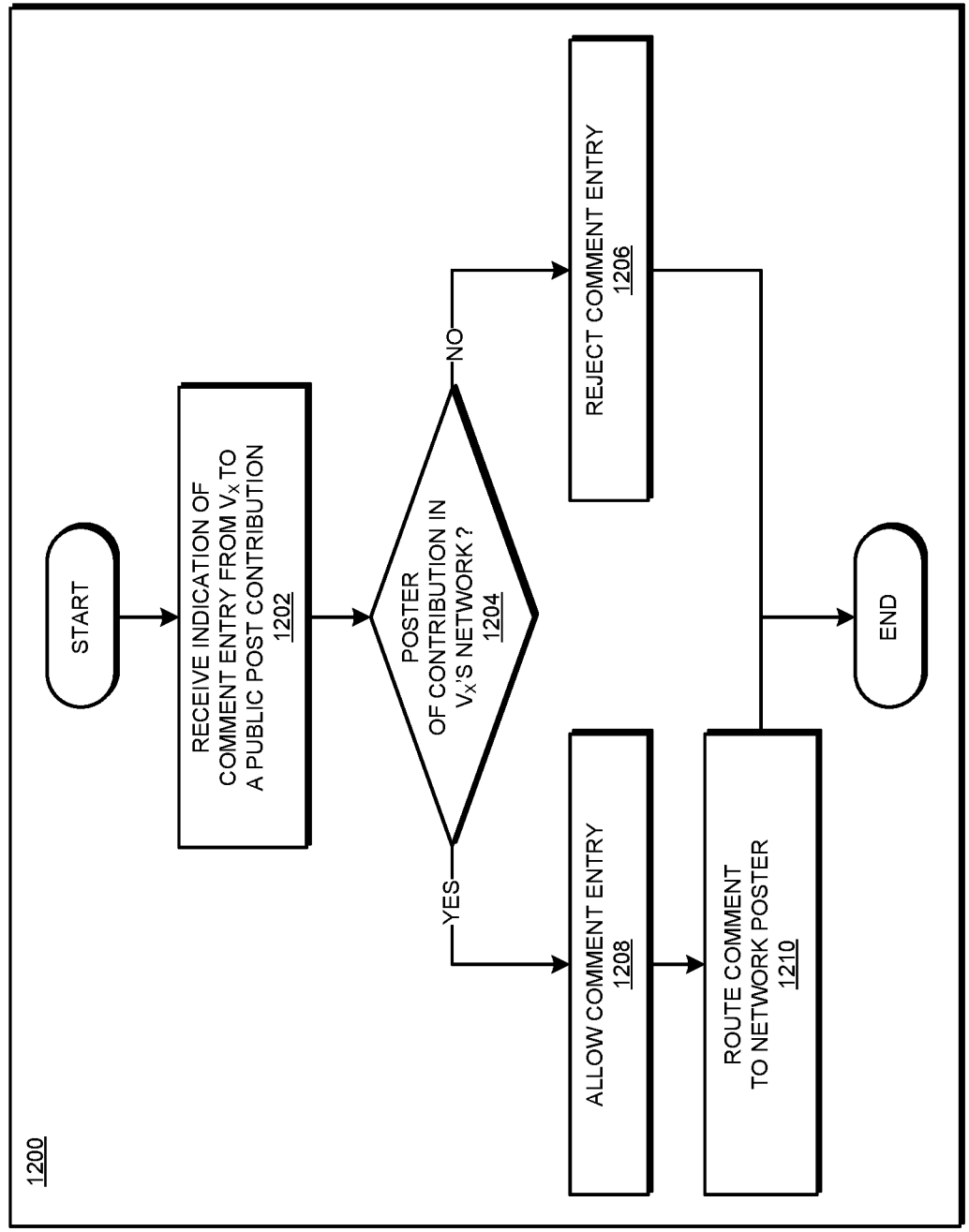
FIG. 12 depicts a flowchart of an example process of managing interactions relative to a public post in accordance with an illustrative embodiment.

With reference to FIG. 12, this figure depicts a flowchart of an example process of managing interactions relative to a public post in accordance with an illustrative embodiment. Process 1200 can be implemented in application 900, e.g., in functionality 926 in FIG. 9.

Process 1200 is only one non-limiting example manner of managing the comments and interactions relative to artifacts in a public post. In process 1200, the application receives an indication that a viewer intends to enter a comment relative to a public post artifact (block 1202). The application determines whether the poster who contributed the artifact is in the viewer's network (block 1204).

If the poster is not in the viewer's network ("No" path of block 1204), the application rejects the comment entry attempt (block 1206) and ends process 1200 thereafter. If the poster is in the viewer's network ("Yes" path of block 1206), the application allows the entry of the comment or interaction (block 1208). The application routes the comment to the in-network poster (block 1210). The application ends process 1200 thereafter.

Thus, a computer implemented method, system or apparatus, and computer program product are provided in the illustrative embodiments for collaborative multiuser publishing of social media posts and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
creating, using a processor and a memory in conjunction with a social media platform, a public post, wherein a first poster contributes a first subset of a set of artifacts used in the public post and a second poster contributes a second subset of the set of artifacts used in the public post;
generating, from the public post, a first version of the public post corresponding to the first poster, wherein the first version of the public post includes the first subset of the set of artifacts contributed from the first poster and an artifact from the second subset of the set of artifacts contributed by the second poster;
generating a first view of the public post for a first viewer, the first view presenting the first version of the public post in a public portion of the first view and a private post of the first poster in a private portion of the first view, wherein the first viewer is a member of a first social network of the first poster;

initializing a timer, the timer limiting a period during which the public post is enabled for editing the first version of the public post, wherein the editing modifies an inclusion status of an artifact in the first version of the public post; and generating a second view of the public post for a second viewer, the second view presenting a second version of the public post in the public portion of the second view.

2. The method of claim 1, further comprising:

generating, from the public post, the second version of the public post corresponding to the second poster wherein the second version of the public post includes the second subset of the set of artifacts contributed from the second poster and an artifact from the first subset of the set of artifacts contributed from the first poster; and presenting a private post of the second poster in the private portion, wherein the second viewer is a member of a second social network of the second poster.

3. The method of claim 1, further comprising:

generating, from the public post, the second version of the public post corresponding to the second poster wherein the second version of the public post includes the second subset of the set of artifacts contributed from the second poster and an artifact from the first subset of the set of artifacts contributed from the first poster; and combining, in the second view, the first version of the public post and the second version of the public post, wherein the second viewer is a member of the first social network of the first poster, and of a second social network of the second poster.

4. The method of claim 3, further comprising:

presenting, in the private portion of the second view, the private post of the first poster and a private post of the second poster in the private portion.

5. The method of claim 1, further comprising:

generating, from the public post, the second version of the public post corresponding to the second poster wherein the second version of the public post includes only the second subset of the set of artifacts contributed from the second poster.

6. The method of claim 1, further comprising:

retaining, in the first view, a single instance of an artifact that is present in the first subset of the set of artifacts contributed from the first poster and the second subset of the set of artifacts contributed from the second poster.

7. The method of claim 1, further comprising:

denying, responsive to the first viewer not being a member of a second social network of the second poster, the first viewer a permission to enter a comment relative to the artifact from the second subset of the set of artifacts contributed from the second poster in the first view.

8. The method of claim 7, further comprising:

allowing, responsive to the first viewer being a member of the first social network of the first poster, the first viewer to enter a second comment relative to an artifact from the first subset of the set of artifacts contributed from the first poster in the first view.

9. The method of claim 1, further comprising:

initiating creating the public post by adding to the public post the first subset of the set of artifacts contributed from the first poster and the second subset of the set of artifacts contributed from the second poster, wherein the first poster and the second poster are members of a group of posters collaborating in the creating of the public post.

10. The method of claim 1, wherein the artifact is a member of any of a plurality of subsets of artifacts, the plurality of subsets of artifacts being contributed by a plurality of members of the group.

11. The method of claim 1, further comprising:

disabling, responsive to the timer expiring, the editing of the first version of the public post.

12. A computer usable program product comprising one or more computer-readable storage devices, and program instructions stored on at least one of the one or more storage devices, the stored program instructions comprising:

program instructions to create, using a processor and a memory in conjunction with a social media platform, a public post, wherein a first poster contributes a first subset of a set of artifacts used in the public post and a second poster contributes a second subset of the set of artifacts used in the public post;

program instructions to generate, from the public post, a first version of the public post corresponding to the first poster wherein the first version of the public post includes the first subset of the set of artifacts contributed from the first poster and an artifact from the second subset of the set of artifacts contributed from the second poster;

program instructions to generate a first view of the public post for a first viewer, the first view presenting the first version of the public post in a public portion of the first view and a private post of the first poster in a private portion, wherein the first viewer is a member of a first social network of the first poster;

program instructions to initialize a timer, the timer limiting a period during which the public post is enabled for editing the first version of the public post, wherein the editing modifies an inclusion status of an artifact in the first version of the public post; and program instructions to generate a second view of the public post for a second viewer, the second view presenting a second version of the public post in the public portion of the second view.

13. The computer usable program product of claim 12, further comprising:

program instructions to generate, from the public post, the second version of the public post corresponding to the second poster wherein the second version of the public post includes the second subset of the set of artifacts contributed from the second poster and an artifact from the first subset of the set of artifacts contributed from the first poster; and program instructions to present a private post of the second poster in the private portion, wherein the second viewer is a member of a second social network of the second poster.

14. The computer usable program product of claim 12, further comprising:

program instructions to generate, from the public post, the second version of the public post corresponding to the second poster wherein the second version of the public post includes the second subset of the set of artifacts contributed from the second poster and an artifact from the first subset of the set of artifacts contributed from the first poster; and program instructions to combine, in the second view, the first version of the public post and the second version of the public post, wherein the second viewer is a member of the social network of the first poster, and of a second social network of the second poster.

15. The computer usable program product of claim 14, further comprising:
program instructions to present, in the private portion of the second view, the private post of the first poster and a private post of the second poster in the private portion.

16. The computer usable program product of claim 12, further comprising:
program instructions to generate, from the public post, the second version of the public post corresponding to the second poster wherein the second version of the public post includes only the second subset of the set of artifacts contributed from the second poster.

17. The computer usable program product of claim 12, further comprising:
program instructions to retain, in the first view, a single instance of an artifact that is present in the first subset of the set of artifacts contributed from the first poster and the second subset of the set of artifacts contributed from the second poster.

18. The computer usable program product of claim 12, further comprising:
program instructions to deny, responsive to the first viewer not being a member of a second social network of the second poster, the first viewer a permission to enter a comment relative to the artifact from the second subset of the set of artifacts contributed from the second poster in the first view.

19. The computer usable program product of claim 18, further comprising:
program instructions to allow, responsive to the first viewer being a member of the first social network of the first poster, the first viewer to enter a second comment relative to an artifact from the first subset of the set of artifacts contributed from the first poster in the first view.

20. The computer usable program product of claim 12, further comprising:
program instructions to initiate creating the public post by adding to the public post the first subset of the set of artifacts contributed from the first poster contributed by the first poster and the second subset of the set of artifacts contributed from the second poster contributed by the second poster, wherein the first poster and the second poster are members of a group of posters collaborating in the creating of the public post.

21. The computer usable program product of claim 12, wherein the artifact is a member of any of a plurality of subsets of artifacts, the plurality of subsets of artifacts being contributed by a plurality of members of a group.

22. The computer usable program product of claim 12, further comprising:
program instructions to disable, responsive to the timer expiring, the editing of the first version of the public post.

23. The computer usable program product of claim 12, wherein the computer usable code is stored in a computer readable storage device in a data processing system, and wherein the computer usable code is transferred over a network from a data processing system.

24. The computer usable program product of claim 12, wherein the computer usable code is stored in a computer readable storage device in a server data processing system, and wherein the computer usable code is downloaded over a network to a data processing system for use in a computer readable storage device associated with the data processing system.

25. A computer system comprising a processor, a computer-readable memory, and a computer-readable storage device, and program instructions stored on the storage device for execution by the processor via the memory, the stored program instructions comprising:
program instructions to create, using the processor and the memory in conjunction with a social media platform, a public post, wherein a first poster contributes a first subset of a set of artifacts used in the public post and a second poster contributes a second subset of the set of artifacts used in the public post;
program instructions to generate, from the public post, a first version of the public post corresponding to the first poster wherein the first version of the public post includes the first subset of the set of artifacts contributed from the first poster and an artifact from the second subset of the set of artifacts contributed from the second poster;
program instructions to generate a first view of the public post for a first viewer, the first view presenting the first version of the public post in a public portion of the first view and a private post of the first poster in a private portion, wherein the first viewer is a member of a first social network of the first poster;
program instructions to initialize a timer, the timer limiting a period during which the public post is enabled for editing the first version of the public post, wherein the editing modifies an inclusion status of an artifact in the first version of the public post; and
program instructions to generate a second view of the public post for a second viewer, the second view presenting a second version of the public post in the public portion of the second view.

* * * * *